F. G. HENRY.
SIGNAL.
APPLICATION FILED MAR. 13, 1916.

1,274,420.

Patented Aug. 6, 1918.
8 SHEETS—SHEET 1.

FIG. 1.

Witnesses

Inventor
Ferdinand G. Henry
By Jason Emrick Lawrence,
Attorneys

F. G. HENRY.
SIGNAL.
APPLICATION FILED MAR. 13, 1916.

1,274,420.

Patented Aug. 6, 1918.
8 SHEETS—SHEET 3.

Witnesses

Inventor
Ferdinand G. Henry,
By Mason Fenwick & Lawrence,
Attorneys

F. G. HENRY.
SIGNAL.
APPLICATION FILED MAR. 13, 1910.

1,274,420.

Patented Aug. 6, 1918.
8 SHEETS—SHEET 5.

UNITED STATES PATENT OFFICE.

FERDINAND G. HENRY, OF PHILADELPHIA, PENNSYLVANIA.

SIGNAL.

1,274,420.  Specification of Letters Patent.  Patented Aug. 6, 1918.

Application filed March 13, 1916. Serial No. 83,952.

*To all whom it may concern:*

Be it known that I, FERDINAND G. HENRY, a citizen of the United States, residing at Philadelphia, in the county of Philadelphia and State of Pennsylvania, have invented certain new and useful Improvements in Signals; and I do hereby declare the following to be a full, clear, and exact description of the invention, such as will enable others skilled in the art to which it appertains to make and use the same.

This invention relates to signals for vehicles and particularly, though not exclusively, to signals for use with automobiles to indicate from the rear or other parts of the automobile the direction in which the automobile is to turn.

A further object of the invention is to provide an electrically operated semaphore with means adjacent to the operator for setting the semaphore either to the right or left, or to a vertical to indicate respectively right and left turns and stops.

A further object of the invention is to provide improved means for rendering the signals visible both by night and by day.

A further object of the invention is to provide improved means for determining from the position of the operator whether or not the signals are properly set.

A further object of the invention is to provide improved means both manual and automatic for releasing the mechanism to return to normal after a corner has been passed either by making the turn or by neglecting to make the turn.

A further object of the invention is to provide a system of lights showing a predetermined color, the color of one of which is changed by the movement of semaphore to any of the aforesaid positions in combination with a system of lights visible to the operator, showing similar colors.

With these and other objects in view the invention consists in certain novel features of construction, combination and arrangement of parts as will be hereinafter more fully described and claimed.

In the drawings:—

Like characters of reference designate corresponding parts throughout the several views.

The improved signaling device which forms the subject matter of this application comprises a housing 50 containing a motor 51 having a shaft 52 carrying a worm 53. Intergeared with the worm 53 is a gear wheel 54 carried rigidly upon the hub 55 free to rotate upon the sleeve 56 formed rigid and preferably integral with the housing and more especially that part of the housing shown at 57 as the cover or closure. Through the latter sleeve extends a spindle 67, being seated in a boss 59 and engaging the rear of the housing as at 60 forming a journal for several parts hereinafter mentioned. Through spindle 67 extends a stud 58 being screwed rigidly into the rear of the housing 50 forming a support for the signal bell 61. The gear 54 is provided with a flange 62 carrying an internal gear 63.

Mounted also upon the spindle 67 is a spider 64. Upon the spider 64 is journaled a pinion 65 intermeshing with the internal gear 63 at one side and at its opposite side with a gear 66 journaled upon the boss 59. The spider 64 is mounted rigidly upon the spindle 67 to which is also rigidly secured the hub 68 of the semaphore 69, so that the spider 64 and the semaphore 69 move always in unison.

Figure 1:
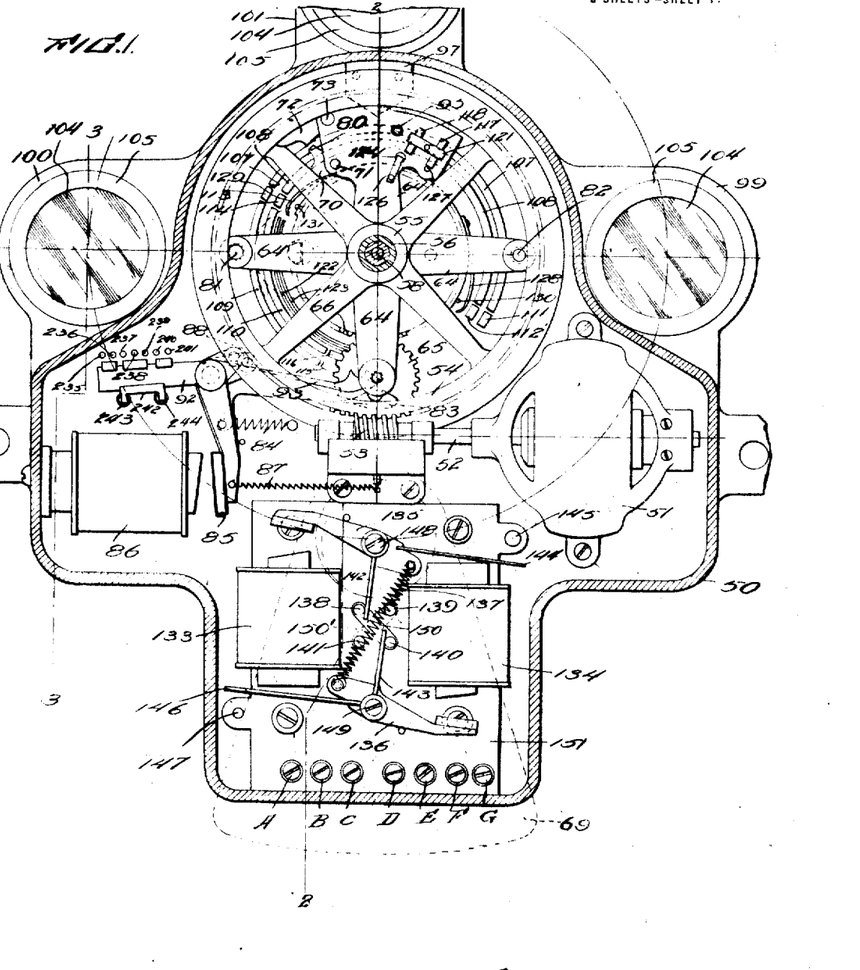
Figure 1 is a view of the improved signal device, the front casing being removed and the wiring being not shown.
Figures 8, 9, 10:
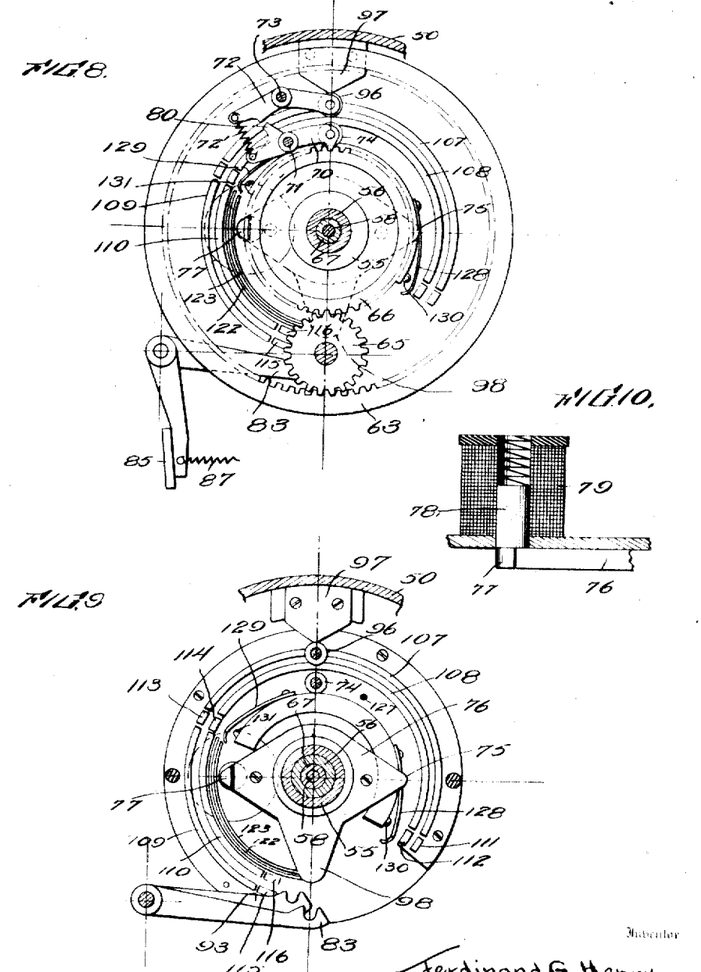
Fig. 8 is a detail front elevation of the limiting detents and adjacent parts.
Fig. 9 is a view similar to Fig. 8 taken at a plane below that of Fig. 8.
Fig. 10 is a sectional view of the solenoid showing the limiting cam in edge elevation.

The weight of the semaphore 69 tends to hold the spider 64 normally in the position shown at Fig. 1, and it is obvious that as the gears 54 and 63 are rotated by the motor 51 the idler gear 65 will cause the gear 66 to rotate. It is also obvious that if means is provided for connecting the spider 64 with the gear 66 the spider and semaphore will rotate therewith. Such means is provided in the detent 70, shown particularly at Fig. 8, being pivoted to the spider at 71 and held yieldingly in position by a spring 72' spanning the interval between the detent 70 and the latch 72, the latter being also pivoted to the spider at 73. When the spider 64 and gear 66 are locked together by the detent 70 as shown at Fig. 8, it is obvious that both will rotate together under the impulse of the motor 51 and continue such rotation until the roller 74 engages the point 75 of the cam 76 when rotating in one direction or by the cam extremity 77 of the core 78 of solenoid 79. When the detent 70 is thus disengaged from the gear 66 it is latched in such disengaged position by the latch 72 engaging in the rear of the finger 80 carried by such detent 70. When so unlatched the gear 66 and spider 64 are disengaged and either may rotate independently of the other.

The spider 64 also carries pins 81 and 82 positioned to be engaged by the latch 83 when the spider rotates in either direction, the said latch 83 being held resiliently to engaging position by the spring 84 attached to the opposite leg of the latch 83. Armature 85 is provided controlled by an electro-magnet 86 and spring 87 carrying a pin 88 extending across the latch 83 so that when the armature 85 is attracted by the magnet 86 the pin 88 depresses the latch 83 against the tension of the spring 84.

Figure 3:
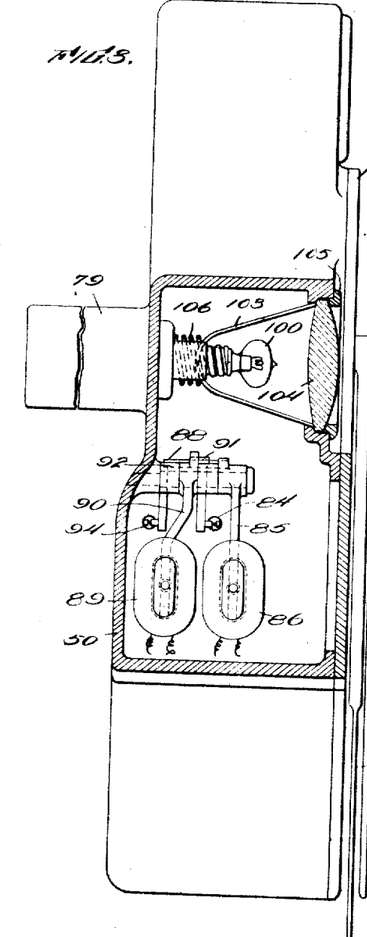
Fig. 3 is a longitudinal sectional view taken on line 3—3 of Fig. 1.
Figures 4, 7:
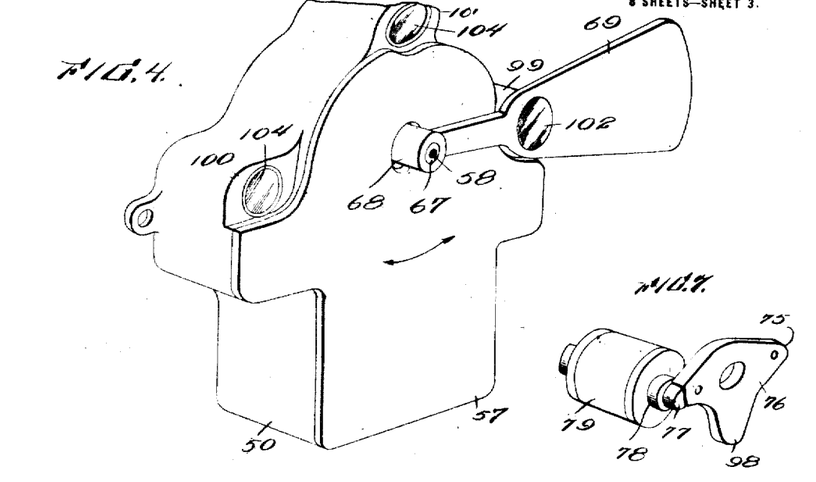
Fig. 4 is a perspective view of the housing showing the semaphore in one turned position, the signal bell and shield being removed.
Fig. 7 is a detail perspective view of the limiting cam and solenoid.
Figure 5:
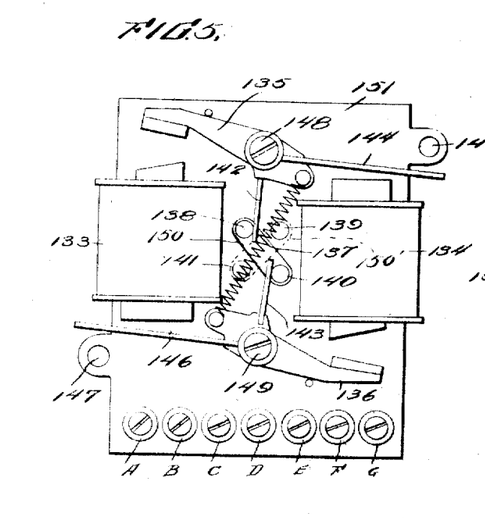
Fig. 5 is an enlarged detail view of one interacting battery of magnetic switches.

It will be noted especially from Figs. 3 and 11 that there are two electro-magnets in juxtaposition, the other electro-magnet 89 acting upon the armature 90 which carries a pin 91 also bearing upon the latch 83 and a switch arm 92, the use and operation of which will be hereinafter described in relation to the electric circuit.

Figures 11, 12, 13, 14, 15:
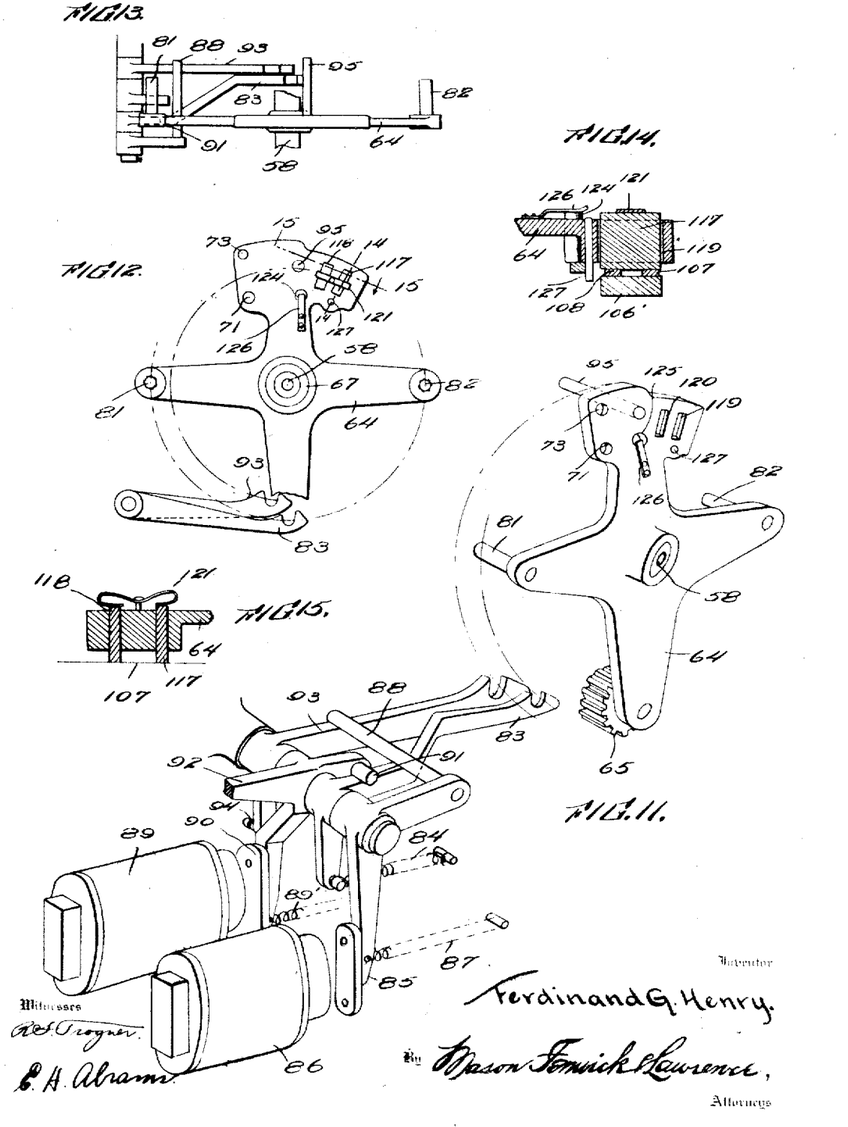
Fig. 11 is a perspective view of the spider with its detents and actuating electro-magnets.
Fig. 12 is a view in front elevation of the spider and detents.
Fig. 13 is a top plan view of the spider and detents.
Fig. 14 is a detail sectional view taken on line 14—14 of Fig. 12.
Fig. 15 is a detail sectional view taken on line 15—15 of Fig. 12.

A second latch 93 is also mounted adjacent the latch 83, but as will be noted from Fig. 12, normally positioned with its latching extremity above the latching extremity of the latch 83. Like the latch 83 the latch 93 is also controlled by the pin 88 carried by the armature 85. The latch 93 is also controlled by a spring 94 holding it yieldingly to position.

The spider 64 carries a pin 95 which, as will be noted from Fig. 12, describes a circumference less in diameter than the circumference described by the pins 81 and 82. As will be noted also from Fig. 13, the pins 81 and 82 are of such length as not to engage the latch 93 but to engage the latch 83, while the pin 95 is positioned to be engaged by the latch 93, but to pass over the latch 83 without engagement.

When, therefore, the spider 64 is rotated by the motor as hereinbefore described such rotation will continue until either the pin 81 or 82 has been engaged in the notch of the latch 83 depending upon the direction of rotation, and simultaneously the roller 74 of the detent 70 will engage the cam extremity 75 or the cam point 77 and release such detent from engagement with the gear 66, whereby the gear 66 is free to rotate under the momentum of motor but without affecting the rotation of the spider and the semaphore 69 which are held in such locked position by the latch 83. When the detent 70 has been raised out of engagement with the gear 66 by engagement with the cam as stated, the latch 72 will engage back of the finger 80 and hold such detent in released position until the spider has been returned to normal which is accomplished by energizing the electro-magnet 86 or 89 to depress the latch 83 and under the weight of the semaphore 69 the parts will be returned to normal. When they reach the normal position the roller 96 upon the latch 72 will engage the cam 97 to disengage such latch from the finger 80 whereupon the spring 72' will return the detent 70 to locking position, and the parts will be held in position for a second cycle of operation. The manner of actuating the several parts electrically will be described hereinafter in relation to the electric circuits.

When it is desired to set the semaphore at a vertical or "stop" position it is necessary to turn the spider one-half a revolution and until the pin 95 is engaged by the latch 93. To accomplish this it is necessary that the roller 74 pass by the cam obstruction 77 to accomplish which the solenoid 79 is energized to draw the core 77 and remove the cam obstruction from the path of movement of the roller 74. When this is accomplished the motor continues to operate until the pin 95 is engaged in the notch of the latch 93 and simultaneously the roller 74 of the detent 70 engages the cam extremity 98, the remaining movements and the return being the same as when the semaphore is set at either side to indicate a turn.

While the turning of the semaphore 69 to right or left will indicate a turn to either right or left direction it is obvious that such signal will be visible only in the light and that signals for the dark are necessary. To provide such signals lamps 99 and 100 are provided on opposite sides of the housing 50 with a third lamp 101 located upon the top of the housing. The semaphore is also provided with a transparent disk 102 positioned to swing over and cover either of the lamps 99, 100 or 101 as occasion may require. The transparent disk of the semaphore will be of a color differing from the colors of the lamps 99, 100 and 101, and for the purposes of illustration only it may be assumed that the color of the lamps is white and the color of the disk green. It will be obvious, therefore, that under normal conditions two white lights will be exhibited, but that when the semaphore is swung to either "turn" position one of the side lights will respectively be covered and will show green, and when swung to "stop" position the top light 101 will be lighted and show green. When the right light shows green and the other white it will be understood that the turn is to be made to the right, the reverse being true when the left light shows green, and that when the top light shows green the vehicle is to stop.

All of the lamps 99, 100 and 101 are preferably electric lamps of the usual and ordinary type, and controlled by the electric current to be hereinafter described. Although unnecessary to the present invention, the lamps are each preferably surrounded by a parabolical reflector 103 with a disk or lens 104 held in position by a gland or bezel 105 with a spring 106 to hold the reflector against the disk 104, and to prevent rattling—all of which is more plainly disclosed at Figs. 2 and 3.

Figure 2:
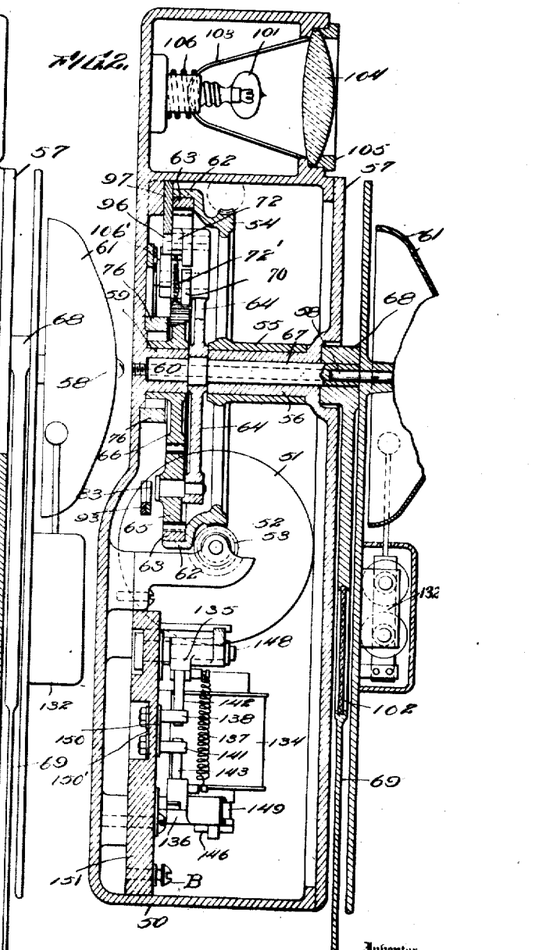
Fig. 2 is a longitudinal sectional view taken on line 2—2 of Fig. 1.

To the back of the housing in the rear of the spider 64 is attached an insulating backing 106' as shown more particularly at Fig. 2, and thereon are mounted electrical contact segments 107, 108, 109 and 110 adjacent and in circumferential alinement with which are contacts 111, 112, 113, 114, 115 and 116. The spider 64 also carries spaced brushes 117 and 118 slidably inserted through openings 119 and 120 as shown more particularly at Fig. 11 and held yieldingly in engagement with the contact strips or contacts above referred to by the spring 121.

Figures 19, 20:
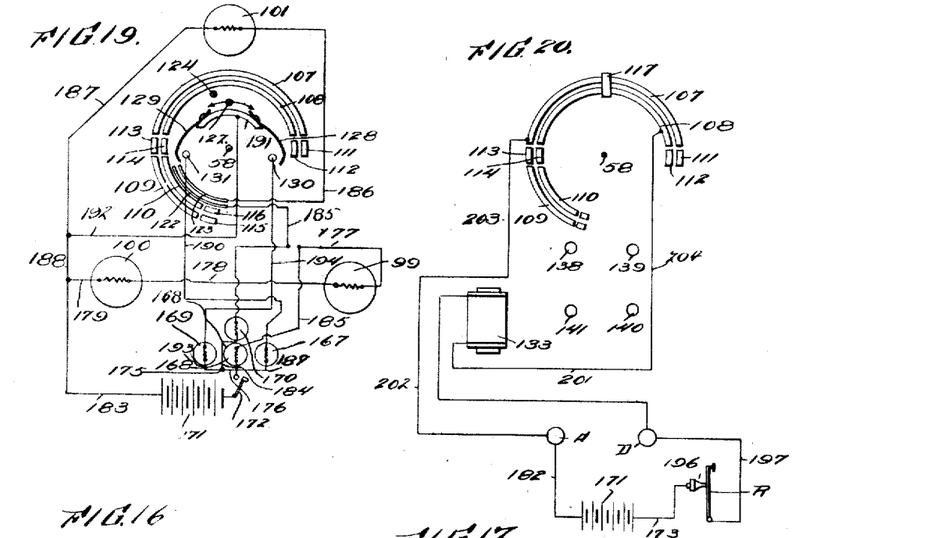
Fig. 19 is a diagrammatic view of the lighting circuit.
Fig. 20 is a diagrammatic view of the circuit first closed in indicating a turn to the right.

Insulating material 106' also carries contact segments 122 and 123, Fig. 19 while the spider carries a brush 124 inserted through a hole 125 in the spider as shown at Fig. 11, and controlled by a spring 126 by which said contact brush 124 is held yieldingly in position to engage the contact strips 122 and 123 when the spider is rotated to the proper position.

Fixed also to the spider is a pin 127 positioned to engage either of the contact springs 128 or 129 as the spider is rotated in either direction to force such springs into engagement with contacts 130 and 131 which are electrically connected in the system as will be hereinafter more fully described.

For properly sounding the alarm an electrical bell mechanism 132 Fig. 2 of substantially the usual and ordinary construction is provided, the electrical circuit for controlling which will be hereinafter more fully described.

Also an electro-magnetic switch mechanism is provided consisting of the magnets 133 and 134 with their respective armatures 135 and 136 with a spring 137 spanning the interval between the two armatures and tending to hold them yieldingly away from the cores of their respective magnets. Interposed between the magnets 133 and 134 are contact posts 138, 139, 140 and 141. The armature 135 is provided with a switch blade 142 adapted to oscillate between the contacts 138 and 139 as the armature is moved, while the armature 136 is provided with a similar switch blade 143 adapted to oscillate between the contacts 140 and 141. The armature 135 also carries a switch blade 144 adapted to engage the contact 145 while the armature 136 carries a switch blade 146 adapted to engage the contact 147. The pivots 148 and 149 of the armatures are also employed as binding posts to receive the wiring of the electric circuit as will be hereinafter more fully described. The contacts 130

138 and 140 are electrically connected by a strip 150, while the contacts 139 and 141 are similarly electrically connected by a strip 150'. The entire switch mechanism above described is mounted on an insulating backing 151 secured within the casing 50. The insulating backing 151 also carries binding posts A, B, C, D, E, F, G, which serve to connect the wires of the several circuits as will be hereinafter more fully described.

Figure 16:
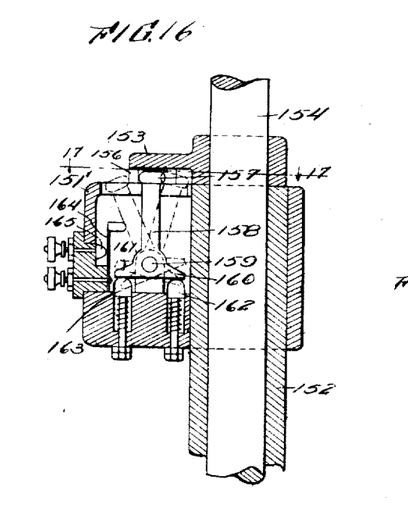
Fig. 16 is a detail sectional view of the switch mechanism shown at Fig. 6, showing the means of attaching to a steering column and steering shaft of an automobile.
Figure 17:
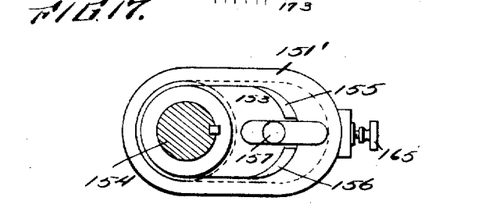
Fig. 17 is a top plan view of the switch mechanism and housing as indicated by line 17—17 at Fig. 16.

For providing an automatic return of the semaphore to normal when set either at a "turn" position or a "stop" position attachment is made with the steering gear of the vehicle so that when a turn is made after setting the apparatus the semaphore will be released to return to normal. Such automatic mechanism is shown in perspective at Fig. 6 and in detail at Figs. 16 and 17. It comprises a housing 151' attached rigidly to the steering column 152 and a cam member 153 rigidly attached to the steering shaft 154 and rotating therewith. The cam member 153 is provided with cams 155 and 156 which engage a roller 157 carried upon a lever 158 pivoted at 159. The lever 158 is provided with perpendicular offset portions 160 and 161 bearing upon spring-pressed plungers 162 and 163 respectively. The shape and position of the cams 155 and 156 as will be apparent more especially at Fig. 17 is such that as the cam member 153 rotates with the steering shaft 154 the roller 157 and lever 158 will be forced toward the steering lever (the dotted line position shown at Fig. 16) until the ends of the cams pass beyond the roller when the spring-pressed plunger 162 will throw the lever back to normal. Upon the return movement of the steering shaft 154 the roller 157 will be engaged upon the opposite sides of the cam 155 to throw such lever to the broken line position shown at Fig. 16 to depress the spring-pressed plunger 163 and engaging against the contact spring 164 force such spring over against the contact 165 to close the circuit, for the purposes hereinafter described.

Figure 18:
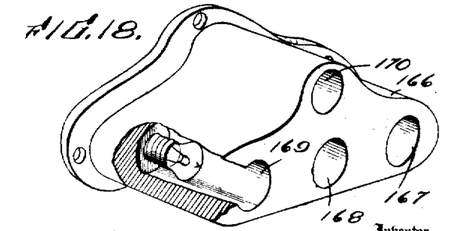
Fig. 18 is a perspective view of the 'telltale" being the device for displaying to the operator lights to indicate the action of the signal.
Figure 24:
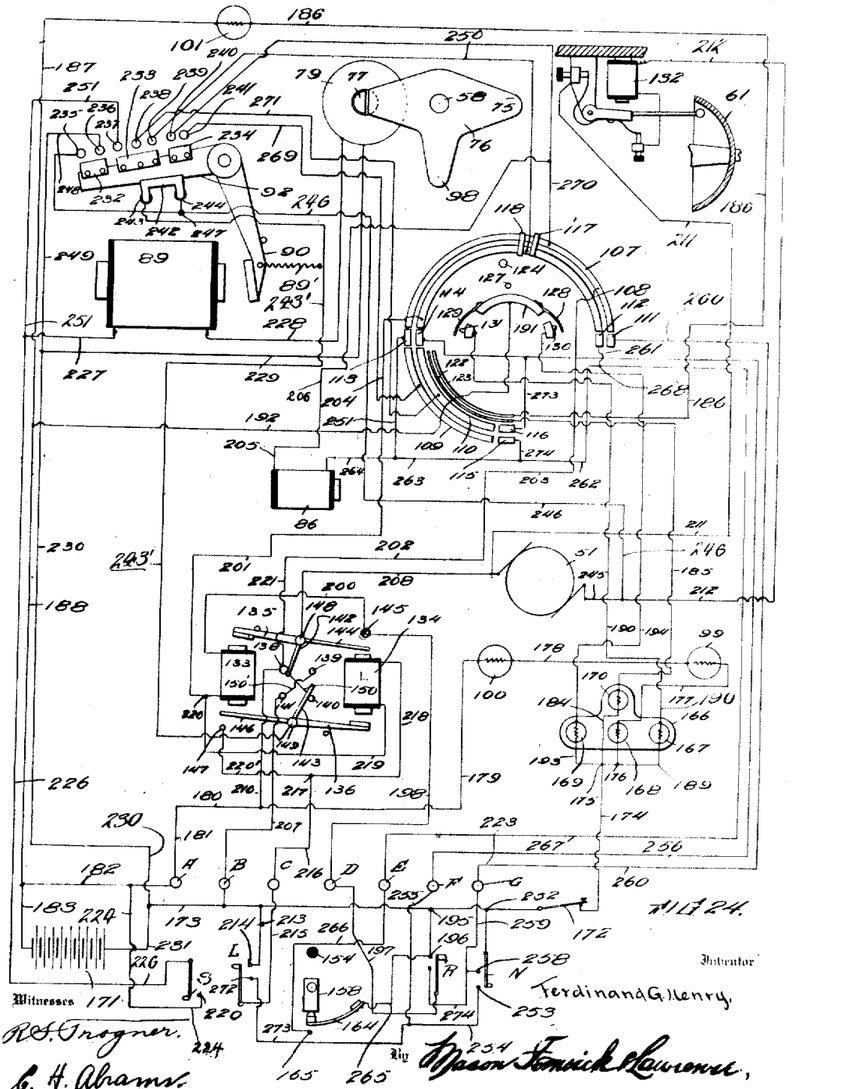
Fig. 24 is a diagrammatic view of the entire wiring and circuits for all purposes.

It is desirable that the operator will be able at all times to detect whether or not and in what manner his signals are set, for which purpose a "tell-tale" is provided as shown in perspective at Fig. 18. The "tell-tale" comprises a housing 166 having deep holes or wells 167, 168, 169 and 170 having lamps located therein as shown in the diagrammatic view, Fig. 24. To correspond with the color scheme hereinbefore mentioned it is desirable that one of the "tell-tale" lights as 168 shall be white while the remainder of the lights 167, 169 and 170 shall be green. The control and function of the several lights will be hereinafter more fully described in connection with the description of the wiring and electric circuits.

The "tell-tale" will be located on the dash of the automobile, or in such convenient position as may be found desirable, and owing to the depth of the holes the lights will at times be located in semi-darkness and will be visible even in daylight to the operator.

The control of the several parts above described is preferably accomplished electrically, for which purpose a source of electrical energy is employed here designated at 171 and called a battery for convenience, it being understood of course that any convenient and available source of electrical energy may be substituted. It will also be understood that a number of different batteries for the several circuits may be substituted within the knowledge of a skilled electrician.

To close the circuit for the various purposes a number of manually operated push-buttons are employed, R indicating the button operated to indicate a turn to the right, L the button operated to indicate a turn to the left, S the button operated to indicate a stop signal, N being employed to restore the parts to normal.

As explained in relation to the lighting, at all times during darkness the two lights 99 and 100 will be lighted. A switch 172 is shown diagrammatically in the circuit at Fig. 24 for controlling these lights. When the switch is closed the lighting circuit is as follows: From battery 171 through line 173 to switch 172, line 174 to point 175 to point 176 through "tell-tale" light 168, line 177 to lamp 99, line 178 to lamp 100, lines 179, 180 and 181 to binding post A, and lines 182 and 183 back to the battery 171. It will thus be seen that "tell-tale" light 168 is in series with lights 99 and 100. The "stop" light 101 and its "tell-tale" 170 are lighted only when the switch S is closed. The lighting of these lamps 101 and 170 is accomplished in this manner. Current from the battery 171 passes through the line 173, switch 172, line 174 to 175, line 184 to "tell-tale" 170, line 185 to contact strip 122, and when the interval between the contact strips 122 and 123 is bridged by the brush 124 the current passes from the contact strip 123 to the line 186 to the lamp 101, and lines 187 and 188 and 183 to battery. The "tell-tale" light 167 is lighted only when a turn is to be made to the right as follows: From battery 171 to line 173 switch 172, line 174 to 175 to 176, line 189 to "tell-tale" 167, line 190 to contact 131 through contact spring 129 and contact plate 191 to line 192, 188 to 183 to battery. The contact spring 129 is in contact with contact 131 only when the pin 127 has rotated one-fourth of a revolution to force such spring downwardly into engagement with the contact. Likewise the tell-tale 169 is lighted only when a turn is to be made to the left as follows: From battery 171 through line 173, switch 172, line 174 to 175, line 193 to "tell-tale" 169, line 194 to contact 130 through contact spring 128 and contact strip 191, lines 192, 188 and 183 to battery. Contact spring 128 is in engagement with contact 130 only when the pin 127 moves one-fourth a revolution in that direction. It is to be understood, of course, that the pin 127 is carried by the spider 64 approximately opposite the major axis of the semaphore 69 so that when the semaphore extends to the right the contact pin 127 will engage the spring at the left and when the semaphore is at the left the pin 127 will engage the contact spring at the right.

To set the signal to indicate a turn to the right the switch R is closed, the first result being that current passes from the battery 171 through the line 173 to point 195, to point 196 through the switch R to line 197, to binding post D, line 198 to point 145, line 200 to electro-magnet 133, lines 201, 204 to contact strip 108, across brush 117 to contact strip 107, line 203 to line 202, line 221 to contacts 138, lines 210—180, binding post A, lines 182 and 183 to battery. This energizes magnet 133 which attracts armature 135, swings switch blade 142 against contact 139, the current then passing from battery 171 through line 173 to binding post B, line 207 to contact 141, through connection 150' to contact 139, through blade 142 to pivot 148, line 208 to motor 51, line 245 to 246 to 247 to 244, through 242 to 243, 243', then to pivot 149 through blade 143 to 140, through 150 to 138, through lines 210—180 and 181 to binding post A, and lines 182, 183 to battery. At the same time that the current is supplied to the motor as above a shunt is taken off to operate the bell mechanism 132 as follows: From line 208 line 211 extends to the bell mechanism and line 212 returns from the bell mechanism to line 245. It will thus be seen that as long as current is supplied to the motor to operate the motor the bell will also be operated to call audible attention to the operation of the visible signal.

If the signal is to be set to indicate a turn to the left, the switch L is closed, throwing the circuit to the magnet 134 as follows: From battery 171 to line 173, through line 213 to contact 214, through switch L through line 215 to binding post C, through line 216 to point 217, through line 218 to magnet 134, from magnet 134 through line 219 to point 220, through lines 201, 204 to contact strip 108, across brush 117 to contact strip 107, through line 203 to line 202 and through line 221, contact 138 through line 210 and 180 and 181 to binding post A, and lines 182 and 183 to battery. The energizing of magnet 134 attracts armature 136 which closes the circuit to the motor but supplying current of an opposite polarity to that supplied when the switch "R" is closed whereby the motor rotates in opposite direction as follows: From battery 171 to line 173 to binding post B, through line 207 to contact 141, through blade 143 to 149, to point 243 through 242 to 244, to 247 to 246 to 245 to motor, returning through line 208 to pivot 148, through blade 142 to contact 138, through lines 210, 180 and 181 to binding post A, through line 182 and 183 to battery. It will be noted that the bell mechanism 132 is also shunted from this circuit as well as from the circuit rotating the motor in the opposite direction.

It is desirable, however, to eliminate the necessity of holding the switches R or L closed manually during the entire operation of the motor to prevent which provision is made for automatically cutting the magnet 133 or 134 into the circuit to maintain such magnet in energized condition and their respective armatures in attracted position. The establishing of the new circuit as regards magnet 133 is as follows: The armature 135 being in attracted position the switch blade 144 is in engagement with contact 145 and the current from the battery will flow as follows: from the battery 171 through line 173 to binding post B, through line 207 to contact 141, through connecting strip 150' to 139, through blade 142 to 148, through blade 144 to 145, and line 200 to magnet 133, through lines 201, 204 to strip 108, across brush 117 to strip 107, through line 203 to 202 to 221 to 138, and through lines 210 to 180 and 181 to binding post A, through lines 182 and 183 to battery. It will be seen that by this arrangement the magnet 133 maintains itself in energized condition even when the switch R is open. When the signal is set for a turn to the left the switch L may be opened for the reason that the magnet 134 has cut itself into a new circuit to maintain itself in energized condition, such new circuit being as follows: Current flows from the battery 171 through line 173 to binding post B, through line 207 to contact 141, through switch blade 143 to pivot 149, through blade 146 to contact 147, through lines 220' and 218 to magnet 134, from magnet 134 through line 219 to point 220, from which point to the strips 108 and 107 and back to the battery, the same circuit as follows in the automatic energizing of the magnet 133.

Figure 21:
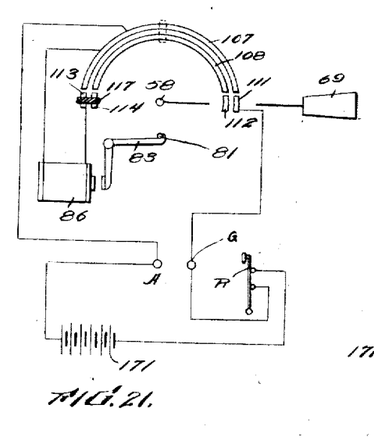
Fig. 21 is a diagrammatic view showing the circuit employed in making a turn to the right, omitting the motor circuit.

When it is desired to set the semaphore in a vertical or "stop" position the switch S is closed, and current will then flow from the battery 171 through the lines 182 and 224 to point 220 then through switch S to line 226 to 227 to magnet 89 through 228 to solenoid 79, through lines 229 and 230 to 231 to battery. This simultaneously energizes magnet 89 and solenoid 79, in the latter case to withdraw the core 78 and the cam extremity 77, and in the former case to attract the armature 90 against the tension of the spring 89' and actuate the switch arm 92, the contact strips 232, 233 and 234 respectively short circuiting contacts 235 and 236, contacts 237, 238 and 239, and contacts 240 and 241. The contact strip 242 simultaneously breaks the circuit between the contacts 243 and 244. This occurring, switch S may be released as the magnet 89 and the solenoid 79 are in circuit as follows: Current will flow from the battery 171 through the lines 183 and 182 to binding post A, through the lines 181 and 210 to contact 138, through switch blade 142 to pivot 148, through line 208 to motor, from the motor passing through line 245, 246 to point 247 to contact 235 through contact strip 232 to 236, through line 248 to 249 to 230 and 231 to battery. The current will flow also from battery 171 through lines 183 and 182 to binding post A, through 181, 180 and 210 to contact 138, through 221, 202, 203 to 107, across brush 117 to line 250, to contact 239 to contact 237 to line 251, and 227 to magnet 89, then through line 228 to solenoid 79, returning through lines 229, 230 and 231 to battery. By this means the magnet 89 maintains itself in energized condition and its several contacts close to complete the circuit, also maintaining the solenoid in energized condition until the circuit is broken, irrespective of whether or not the switch S is maintained in closed position. The withdrawing of the solenoid tip 77 forming a part of the cam 76 permits the rotation of the spider 64 until the roller 74 comes in contact with the point 98 of the cam so that the semaphore will stand in a vertical or "stop" position. It will be noted that in each case to energize the motor to move the semaphore to either the right, left or "stop" position the current must pass between the contact strips 107 and 108, through the brush 117, and it is obvious of course that as soon as the brush moves off of the contact strips the circuit will be broken. The arcs of the contact strips 107 and 108 are such that the brush 117 passes off from either end of such contact strips at the moment when the pins 81 or 82 engage the latch 83, and the roller 74 of the detent 70 engages the cam extremity 75 or the movable cam extremity 77. When, therefore, the semaphore has been moved one-fourth of a revolution in either direction to set at either right or left the brush 117 will pass off the contact strips and break the circuit supplying current to the motor, and will also break the circuit supplying current to the magnet 133 or 134 as the case may be, thereby permitting the spring 137 to act on the armature to break the circuit in another place and complete the releasing circuit whereby the parts are set at normal. When the semaphore has been set to indicate a right turn the brush 117 has passed off of the contact strips 107 and 108 and is in engagement with the contacts 113 and 114. If, now, the switch N is closed the latch 83 will release the pin 81 in the following manner: Current from battery 171 flows through lines 231 and 173 to 252 to contact 253, through lines 254 and 255 to binding post F, through line 256 to contact 114. It will be recalled that the brush 117 is now spanning the interval between the contacts 113 and 114 so that the current flows across said brush 117 to line 251 to magnet 86, through 205, 206 and 270 to 107 to lines 203, 202 and 221 to 138 through lines 210, 180 and 181 to binding post A, lines 182 and 183 to battery. This will energize magnet 86 attracting armature 85 against the tension of spring 87, depressing pin 88 and therewith latch 83 which is in engagement with pin 81, releasing pin 81 so that the weight of the semaphore arm may return the parts to normal. It will be remembered that the spider 64 carrying the semaphore arm and the gear 66 are independent of each other at this point by reason of the detent 70 being held out of engagement by the latch 72, but that when it is returned to normal the roller 96 is depressed by the cam 97 to unlatch the latch 72 and permit the detent 70 to fall into engagement with the gear 66, thereby locking the parts in initial position. When the semaphore is set for a left turn the action is similar except that current passing the switch N passes to contact 258, line 259 to binding post G, through line 260 to contact 111, across brush 117 to contact 112, through lines 261, 262, 263 and 264 to the magnet 86, the remaining action being equivalent in all respects to the action when the semaphore is set at right turn.

If the semaphore is set at "stop" signal it is released to return to normal by actuating the switch N which action is exactly the same as restoring to normal when set at the right turn position, the energizing of the magnet 86 depressing the latch 94 and releasing the pin 95 the same as depressing the latch 83 releases the pin 81. It will be understood, however, that when the signal is set at "stop" the magnet 89 being energized the latch 83 will remain in depressed position to permit the passage both ways of the pin 81, such depression being accomplished by the pin 91 bearing upon the latch 83 and maintaining such latch in depressed position so long as the magnet 89 is energized irrespective of the position of the pin 88.

When the semaphore is set at any of the aforesaid turn positions it is desired to return them to normal automatically by the act of turning the corner designated. For this purpose the contact spring 164 is closed against the contact 165 as hereinbefore described, the current then flowing from the battery 171 through lines 231, 173 to point 195 to 196, through line 265 to spring 164 to contact 165, line 266 to binding post E, through line 267 to point 268, through lines 262, 263 and 264 to magnet 86, through lines 205, 206, 270 to strip 107 through lines 203, 202 and 221 to point 138, through lines 210, 180, 181 to binding post A, and through lines 182 and 183 to battery. This energizes the magnet 86 the same as closing the switch N whereby the spider is automatically released to permit the semaphore to return to normal.

It will also be noted that when magnet 89 is energized the contact strip 108 is electrically connected to the strip 110 through the line 250 to contact 239 to contact 238 through line 271, to contact strip 110, and contact strip 107 is also electrically connected to strip 109 through line 270 to contact 240 to contact 241, and through line 269 to contact strip 109.

Provision must be made also for the contingency arising from the operator having set the signal for a turn and passing the corner without making a turn desires to make a turn at a subsequent corner. If the subsequent turn is to be made in the same direction, it is obvious that by closing the same switch no action will result, but if the turn is to be made in the opposite direction it is necessary that provision be made for swinging the semaphore through half its circumference to the opposite direction.

By closing switch L to make the left turn, therefore, current will flow from the battery 171 through the lines 231, 173, 213 to contact 214, through the switch L to contact 272, through the line 273 and 255 to binding post F, through line 256 to contact 114, across brush 117 then located in that position to contact 113, through lines 251 and 264 to magnet 86, through lines 206 and 270 to 107, to lines 203, 202 and 221 to point 138, through lines 210, 180 and 181 to binding post A, and through lines 182 and 183 to battery. This will energize the magnet 86 and attract the armature 85 to depress the latch 83 and release the spider 64. As soon as the brush 117 has moved off of the contacts 113 and 114 the circuit to the magnet 86 is broken, so that the latch 83 is returned to normal, but immediately on passing off of contacts 113 and 114 the brush 117 short circuits the contact strips 107 and 108. This throws the magnet 134 into circuit as follows: Current from the battery 171 passes through lines 231 and 173 and 213 to contact 214, through the switch L to line 215 to binding post C, through lines 216 and 218 to magnet 134, through lines 219, 220, 201, to contact strip 108, through brush 117 to contact strip 107, through lines 203, 202, 221 to point 138, then through lines 210, 180 and 181 to binding post A, through lines 182 and 183 to battery. The magnet 134 being energized attracts the armature 136, swinging the switch arm 143 against the contact 141 which closes the circuit to the motor as follows: Current from the battery 171 flows through the lines 231 and 173 to binding post B, through the line 207 to contact 141, through the switch arm 143 to pivot 149, 243 through 242 to 244 to 247 to lines 246 and 245 to motor, returning through the line 208 to pivot 148, through the switch arm 142 to contact 138, through lines 210 and 180 and 181 to binding post A, through the lines 182 and 183 to battery. It is obvious therefore that the motor will continue to rotate until the brush 118 has passed off of the contact strips 107 and 108 onto the contacts 111 and 112, whereupon the circuit to the magnet 134 will be broken and the return of the armature 135 to normal will break the circuit to the motor and the parts will stop as hereinbefore described with the semaphore set at left turn signal.

If the signal is already set at the left and the turn is to be made to the right, the current will flow as follows: from the battery 171 through the lines 231 and 173 to point 195, to contact 196, through the lines 274 and 259 to binding post G, through line 260 to contact 111, and through the brush 118 now spanning the interval 111 and 112 to line 261, through lines 262, 263 and 264 to magnet 86, through lines 205, 206, 270 to 107, to lines 203, 202 and 221 to point 138 through lines 210, 180 and 181 to binding post A, and through lines 182 and 183 to battery. This will energize the magnet 86 releasing the spider and permitting the brushes 118 and 117 to pass from the contacts 111 and 112 to the contact strips 107 and 108. The bridging of the interval between the contact strips 107 and 108 will energize the magnet 133 as follows: From battery 171 the current will flow through the lines 231 and 173 to point 195 to contact 196, through the switch R to 197 and binding post D, through line 198 to 145, through 200 to the magnet 133, through line 201, to contact strip 108, across the brushes 117 and 118 to contact strip 107, through lines 203, 202 and 221 to point 138, through lines 210, 180 and 181 to binding post A, through 182 and 183 to battery. The energizing of the magnet 133 attracts the armature 135, swinging the switch arm 142 into engagement with the contact 139 so that current will be supplied to the motor as follows: from the battery 171 through the lines 231 and 173 to binding post B, through 207 to contact 141, across 150' to contact 139, through switch arm 142 to 148, through line 208 to the motor, returning through lines 245 and 246 to point 247 to 241 through 242 to 243, 243' to pivot 149 through 143 to 140 to 138, through line 210 to 180, 181 to binding post A, and through lines 182 and 183 to battery.

It is obvious, of course, that the releasing of the signal so set will be accomplished in the same manner as hereinbefore described.

Figure 22:
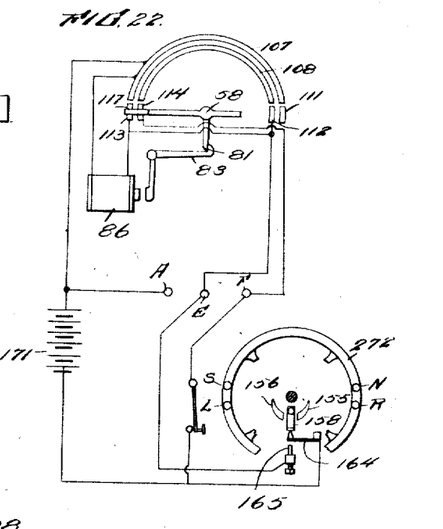
Fig. 22 is a diagrammatic view of the restoring or releasing means.
Figure 23:
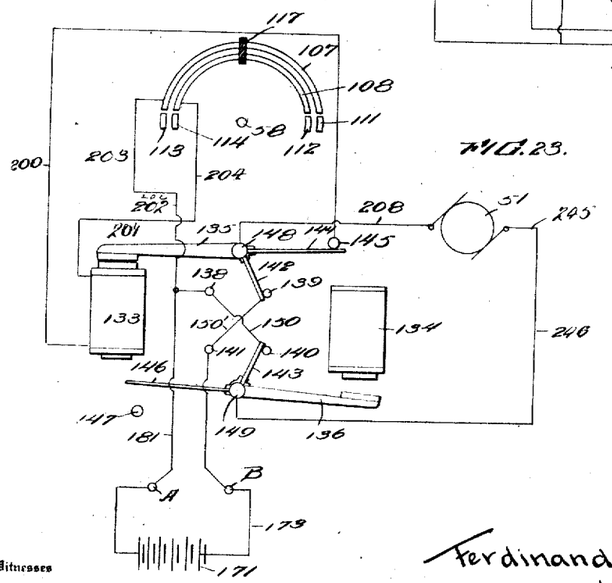
Fig. 23 is a diagrammatic view of the motor circuit indicating a turn to the right.

The push buttons R, N, L and S are preferably located on the steering wheel of the vehicle 272 as shown more particularly at Fig. 22, although it is to be understood of course that such switches may be located anywhere for the convenience of the operator.

In operation, if a turn is to be made to the right and it is desired to set the semaphore at the right turn signal, switch R is closed manually. The closing of the switch R energizes the magnet 133, attracting the armature 135 which, operating the electromagnetic switch, switches current to the motor 51 which, being energized, rotates the shaft 52 in the proper direction to rotate the gears 54 and 63 in the direction to lift the semaphore to a right-hand position. The gear 63, being in engagement with the pinion 65, and the gear 66 also being locked in engagement with the spider 64 by the detent 70, the entire mechanism rotates as an organized structure with the gear 54. This rotation is continued until the pin 81 is engaged by the latch 83 and simultaneously the detent 70 is disengaged from the gear 66 by riding up on the cam extremity of the core 77 of the solenoid 79. The spring 72' acting on the latch 72 engages the finger 80 of the detent 70 and locks it in such opened position, whereby the gear 66 and pinion 65 are free to rotate under the continued momentum of the motor. The current to the motor, however, is cut off at the instant when the detent 70 is disengaged, such cutting off being accomplished by the brush 117 running off of the contact strips 107 and 108 onto the contacts 113 and 114, as shown particularly at Fig. 21. As the current supplied to energize the magnet 133 passes through the contact strips 107, 108 and brush 117, it is obvious that when the brush 117 passes off from the contact strips 108 and 107 the circuit to the magnet 133 is broken whereby the armature 135 is released, thereby instantly breaking the circuit to the motor. As this is all accomplished at the instant when the detent 70 engages the cam core 77 it is obvious that the continued rotation of the motor will only be by its own momentum and that the current will cease to be supplied to the motor at that instant. The spring 87, however, acting upon the latch 83 engages the pin 81 and holds the semaphore in such horizontal position until released.

Figure 6:
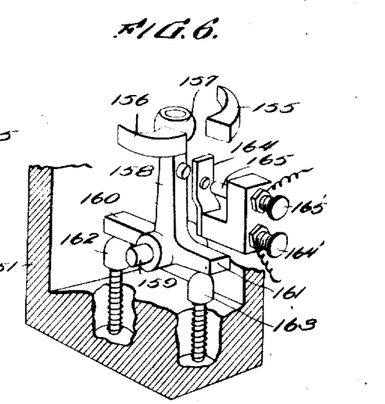
Fig. 6 is a detail perspective view of the automatically actuated switch for returning the semaphore to normal.

It is obvious that in ordinary use the semaphore may be set for a turn and that if upon reaching the corner it is discovered for some reason that the turn should not be made and the vehicle continues straight ahead, then for such purpose a manual release of the semaphore to return to normal is desired and where a turn is made an automatic return is desired. The automatic return is accomplished by the cam 155 carried by the steering shaft engaging the lever 158 and rocking it upon its fulcrum 159 against the tension of the spring-pressed plungers 162 and 163 as shown at Fig. 6. With the return of the steering wheel to normal the roller 157 will drop through the slot between the cams 155 and 156 breaking the circuit at this point, but prior to that period the lever 158 has been moved against the tension of the spring-pressed plunger 163 to throw the contact spring 164 into engagement with the contact 165, whereby the wire connected with the binding posts 164' and 165' are electrically connected. This closes the circuit to the magnet 86 which, being energized, attracts the armature 85 attached to the pin 88 which, bearing upon the latch 83, depresses such latch and disengages the pin 81 from such engagement permitting the weight of the semaphore arm to return such semaphore and spider to normal position. When such normal position is reached the cam 97 engages the latch 72, releases the detent 70, and permits it to engage the gear 66 whereby the parts are again set for operation.

In case the turn is not made at the corner as just described, closing the manual switch N likewise energizes the magnet 86, the result being the same.

If the turn indicated is to be to the left the switch L is closed energizing the magnet 134, attracting the armature 136, closing the circuit to the motor, but supplying current of an opposite polarity to that supplied when the switch R is closed whereby the motor rotates in the opposite direction. The action is the same, rotating the various parts in the opposite direction until the brush 117 passes off of the strips 107 and 108 onto the contacts 111 and 112. In this case the pin 82 is engaged by the latch 83, holding the semaphore at a left horizontal position, the cutting out of the motor, the continued rotation of the parts under the momentum of the moving motor being the same, and the return to normal being the same either manually or automatically.

When the "stop" signal is to be set the switch S is closed, energizing the magnet 133, but also energizing the magnet 89 and the solenoid 79. The energizing of the solenoid 79 draws the core inwardly against the tension of its spring, whereby the cam obstruction is removed and the spider continues to rotate until the detent 70 is disengaged by engagement with the cam extremity 98 and the pin 95 has been engaged by the latch 93. It will be noted that the brush 118 is mounted adjacent the brush 117, this being provided to span the interval between the strips 107 and 108 on the one hand and 109 and 110 on the other hand so that in setting the "stop" signal the brush 118 engages the strips 109 and 110 before contact between 107 and 108 has been broken by the passing of brush 117 off of such strips, so that the magnet 133 continues to be excited until the brush 117 has passed through one-half a revolution off of the strips 107 and 108, and 109 and 110 successively onto the contacts 115 and 116.

The releasing of the semaphore now set at vertical is similar to the releasing of the semaphore when set at either right or left, but is released only manually so that any desired turn of the steering wheel may be made in the act of stopping without affecting or releasing the signal set at "stop."

When the switch 172 is closed the lights 99 and 100 and the "tell-tale" light 168 are lighted and continued in lighted condition. When a turn is made to the right the pin 127 carried by the spider 64 closes the contact spring 129 against the contact 131 and lights "tell-tale" light 167. This lights only when the motor has actually turned the semaphore to right-hand signal and does not light from simply closing the switch R. Likewise when the semaphore is actually turned to left-hand position it closes the contact spring 128 against the contact 130 and lights "tell-tale" light 169.

When the S switch is closed and the brush 124 engages the contact strips 122, 123, the light 101 and the "tell-tale" light 170 are lighted, and remain in such lighted condition so long as the semaphore is in "stop" position. In all of these cases it will be understood, of course, that as soon as the semaphore is returned to normal the "tell-tale" lights, with the exception of 168, are extinguished and the rear light 101 is also extinguished. It therefore follows that the "tell-tale" at all times will show the light 168 if the lights 99 and 100 are lighted which, all being mounted in series, will be extinguished if either of such rear lights 99 and 100 are extinguished. Also the "tell-tale" light 170 being in series with the rear light 101 does not light unless such rear light 101 lights, so that the operator may at all times determine whether or not his lights are properly lighted. By opening the switch 172 current to all the lights is interrupted but the mechanical and electrical operation of the mechanism is not affected.

It has also been explained that while current is being supplied to the motor 51 the shunt to the bell 132 is always supplied with current so that the operator may know whether or not his motor is operating wholly aside from the use of the "tell-tale" lights.

I claim:—

1. In a signaling device, a support, lights carried upon opposite sides of the support, an arm pivoted upon the support to swing in opposite directions, a transparent colored disk carried by the arm positioned to swing in front of either light, a motor for operating the arm, means to supply current to operate the motor in either direction, means to latch the arm with the disk covering one of the lights, and means to release the arm to permit the arm to swing to normal.

2. In a signaling device, spaced lights, an arm journaled between the lights and adapted to swing in either direction, a transparent disk carried by the arm positioned to cover either of the lights, a motor connected with the arm, a source of electrical energy, means to supply current to the motor from opposite sides of the source of electrical energy to rotate the motor in opposite directions, means to latch the arm with the disk covering one of the lights, and electro-magnetic means for releasing the latch.

3. In a signaling device, a housing, spaced lamps carried by the housing, an arm journaled between the spaced lamps, a third lamp carried by the housing normally unlighted, a transparent disk carried by the arm positioned to cover either of the three lamps, a motor connected with the arm, means to rotate the motor in either direction, means to engage and stop the arm in front of either of the spaced lamps, and means to selectively remove the stopping means and permit the arm to rotate to cover the third lamp and simultaneously to light the lamp, means to lock the arm in such latter position, and means to release the arm and permit the arm to return to normal.

4. In a signaling device, a support, an arm journaled upon the support, a motor connected with the arm, means to oppositely energize the motor to rotate the arm in opposite directions, means to stop and lock the arm in a horizontal position upon either side of its journal, and means to remove the stopping means and permit the arm to rotate to a vertical, means to stop and lock the arm at the vertical position, and means to release the arm at any of the stop positions and permit the arm to return to normal.

5. In a signaling device, a rotating member, a cam positioned to engage the rotating member at predetermined positions, and a solenoid having a core forming a part of said cam.

6. In a signaling device, a solenoid, a cam embodying at one extremity the end of the solenoid core, a rotating part, a detent carried by the rotating part positioned to be engaged by the cam extremity of the solenoid core, and other extremities of the cam positioned to engage the detent when the detent has passed the solenoid core, the latter being withdrawn by the solenoid being energized.

7. In a signaling device, a rotating member provided with a plurality of pins of different lengths and rotating in different arcs, latches positioned to selectively engage the pins and stop the rotation of the rotating member, and electro-magnetic means for actuating the locking members.

In testimony whereof I affix my signature.

FERDINAND G. HENRY.